Jan. 14, 1930.  R. C. GOODELL  1,743,449
NUT CRACKER
Filed Oct. 1, 1927
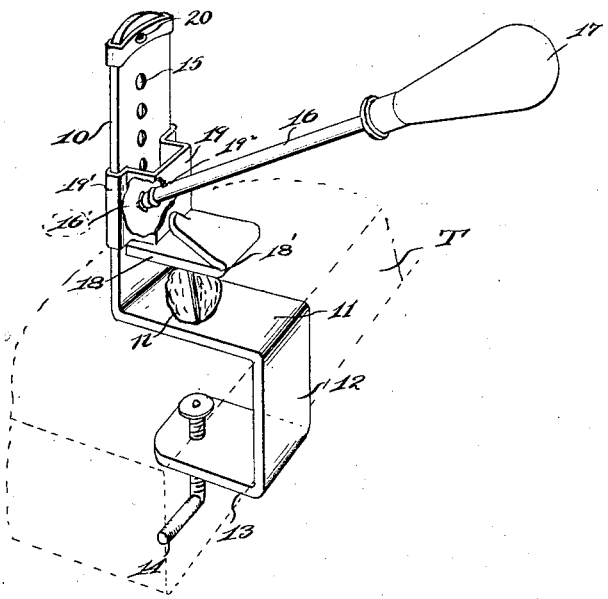
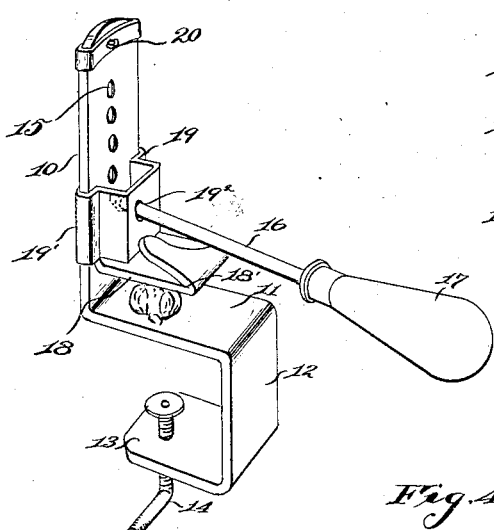
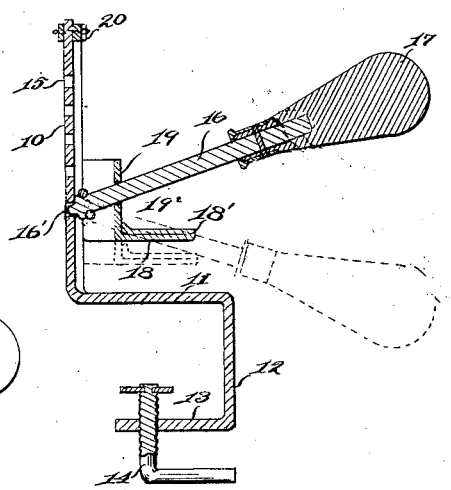
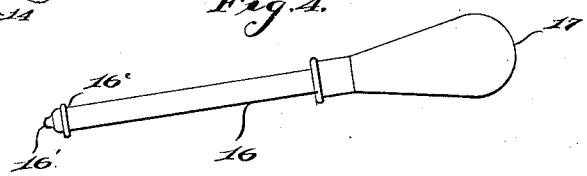
Inventor
R.C. Goodell
by Hazard and Miller
Attorneys Patented Jan. 14, 1930

1,743,449

UNITED STATES PATENT OFFICE

RICHARD C. GOODELL, OF SANTA BARBARA, CALIFORNIA

NUTCRACKER

Application filed October 1, 1927. Serial No. 223,379.

My invention relates to a nut cracker.

It is an object of this invention to provide a very simple nut cracker construction, inexpensive of manufacture, which is instantly adjustable to different sizes of nuts to be cracked, and which while exerting great pressure in cracking the shell of the nut will merely crack the shell without crushing the kernel.

Another object of my invention is to provide a nut cracker consisting of an upright integral with a support which may be temporarily secured to a table or the like. The upright is provided with a series of vertically arranged apertures for selectively receiving the fulcrum of a lever which operates a nut cracking plate which is slidably mounted on the upright.

My invention consists of the construction and combination of parts hereinafter described and claimed.

Referring to the accompanying drawings which form a part of the specification, I have illustrated by way of example an embodiment of my invention and in which:

Figure 1 is a perspective view of my nut cracker, with parts broken away to show the interior construction in position for cracking a nut.

Figure 2 is a similar view just after the nut cracking operation.

Figure 3 is a vertical cross section of the nut cracker.

Figure 4 is a detail view of the lever.

Referring to the drawings, T indicates a portion of a table or the like to which the nut cracker is clamped. The nut cracker consists of a vertical upright 10 made of a strip of metal which is integral with a horizontal nut receiving plate 11, at the outer end of which is a vertical plate 12 which is bent inwardly at 13 and in which latter a clamping screw 14 is disposed whereby the nut cracker may be clamped to the table T.

The upright 10 is preferably concavo-convex in horizontal cross section and is provided with a series of apertures 15 vertically arranged along its median line for selectively receiving the reduced outer end 16′ of a lever 16 of the second order. The lever is provided with a handle 17. A movable nut cracking plate 18 is arranged parallel to the nut supporting plate 11. The nut cracking plate 18 is made of a sheet of metal which is bent upon itself as at 18′ to afford a double thickness.

The nut cracking plate 18 is, on its inner end, bent upwardly to form a nut cracking plate operating member 19, U shaped in horizontal cross section, provided at opposite sides with grooved flanges 19′ engaging the lateral edges of the upright member 10 for sliding movement. The member 19 is provided with an aperture $19^2$ through which the stem of the lever 16 extends. 20 is a removable stop at the upper end of the upright 10, limiting the upward movement of the member 19.

The operation is as follows:

The nut $n$ to be cracked, is placed on the nut receiving plate 11 and the cracking plate 18 is allowed to slide downwardly on the upright 10 into engagement with the top of the nut. During this sliding movement, the lever 16 is pulled outwardly away from the upright 10 to enable the cracking plate to slide freely. When the cracking plate 18 is in engagement with the top of the nut, the lever 16 is pressed toward the upright 10 and its blunt or rounded end 16′ is inserted in the next lower aperture 15. The lever is then swung downwardly from the full line position shown in Figure 3 to the dotted line position shown in this figure, and as it is swung through this movement, it will force the cracking plate 18 to crack the shell of the nut. As soon as the lever 16 is swung downwardly some distance below a horizontal position, by virtue of the fact that it has a rounded blunt end 16′, this end, because of the natural movement of the operator's hand, will slide out of the aperture 15, allowing the lever to be swung into engagement with the outer edge 18′ of the cracking plate 18. As soon as the lever strikes the edge 18′ it tends to cause the cracking plate 18 to tilt relatively to the support or upright 10. The tilting movement of the cracking plate which is very slight, is sufficient to cause it to bind on the upright 10 so that it will not slide downward any further distance which might crush the kernel of the nut. As soon as the nut is cracked, the cracking plate can be lifted by the lever and the lever will be held from sliding outwardly through the aperture $19^2$ by a ring $16^2$ mounted on the lever adjacent its end $16'$. It will be noted that the greatest leverage comes into play when the lever 16 is in an approximately horizontal position, and this occurs when the shell of the nut is being cracked by the cracking plate.

Various changes may be made in the construction and combination of parts by those skilled in the art without departing from the spirit of my invention as claimed.

I claim:

1. A nut cracker comprising an upright having a concave face provided with a series of apertures vertically aligned and constituting fulcrums, a nut supporting plate integral with said upright, means for clamping said plate to a support, a nut cracking member including a slidable member having grooved flanges engaging the lateral edges of said upright, said slidable member having an aperture, a lever having a reduced end for selectively engaging said fulcrums and passing through said aperture, and a stop on said lever to prevent its withdrawal from said slidable member.

2. A nut cracker comprising an upright provided with a series of apertures constituting fulcrums, a nut supporting plate, a support for said plate, a nut cracking member including a slidable member engaging the lateral edges of said upright, said slidable member having an aperture, a lever for selectively engaging with one end of said fulcrums and passing through said aperture, and a stop on said lever to prevent its withdrawal from said slidable member.

3. A nut cracker comprising an upright provided with a series of apertures constituting fulcrums, a nut supporting member, means for fastening said upright to a support, a nut cracking member mounted for slidable movement on said upright and provided with an aperture, a lever passing through said aperture and adapted to selectively engage said fulcrums, and a stop on said lever to prevent its withdrawal from said nut cracking member.

4. A nut cracker comprising an upright provided with a series of apertures constituting fulcrums, a nut cracking member mounted for slidable movement on said upright, and a lever loosely supporting intermediate its ends said nut cracking member and adapted to selectively engage said fulcrums.

5. A nut cracker comprising an upright having a series of apertures constituting fulcrums, a nut cracking member comprising an operating member and a cracking plate extending angularly therefrom, said operating member slidably embracing said upright, and a lever extending loosely through an aperture in said operating member and having a reduced end selectively engageable with said fulcrums, said reduced end being automatically releasable from said fulcrum as the lever moves downward, and said lever upon such release being engageable with said plate at a point further from the upright than said operating member.

In testimony whereof I have signed my name to this specification.

RICHARD C. GOODELL.